United States Patent
Rola

(10) Patent No.: US 12,348,549 B1
(45) Date of Patent: Jul. 1, 2025

(54) SYSTEMS AND METHODS FOR AUTOMATED TESTING FOR DOMAIN BLOCKING ASSESSMENT

(71) Applicant: GEN DIGITAL INC., Tempe, AZ (US)

(72) Inventor: Iskander Sanchez Rola, Antibes (FR)

(73) Assignee: Gen Digital Inc., Tempe, AZ (US)

( * ) Notice: Subject to any disclaimer, the term of this patent is extended or adjusted under 35 U.S.C. 154(b) by 441 days.

(21) Appl. No.: 17/658,796

(22) Filed: Apr. 11, 2022

(51) Int. Cl.
H04L 9/40 (2022.01)

(52) U.S. Cl.
CPC .................. *H04L 63/1433* (2013.01)

(58) Field of Classification Search
CPC .................................................. H04L 63/1433
See application file for complete search history.

(56) References Cited

U.S. PATENT DOCUMENTS

| | | | | |
|---|---|---|---|---|
| 10,375,020 | B2* | 8/2019 | Wing | H04L 63/101 |
| 10,375,091 | B2* | 8/2019 | Leung | H04L 63/101 |
| 11,520,850 | B1* | 12/2022 | Sanchez Rola | G06F 16/958 |
| 11,949,679 | B1* | 4/2024 | Sanchez Rola | H04L 63/10 |
| 11,972,027 | B1* | 4/2024 | Sanchez Rola | H04L 63/20 |
| 2013/0047148 | A1* | 2/2013 | Lui | G06F 8/65 717/173 |
| 2017/0093893 | A1* | 3/2017 | Davydov | G06F 21/51 |
| 2017/0161253 | A1* | 6/2017 | Silver | H04L 67/289 |
| 2017/0235829 | A1* | 8/2017 | Han | G06F 16/951 707/706 |
| 2018/0063190 | A1* | 3/2018 | Wright | H04L 63/1425 |
| 2018/0075256 | A1* | 3/2018 | Robinson | H04L 63/1466 |
| 2019/0020666 | A1* | 1/2019 | Leung | H04L 63/0227 |
| 2019/0340212 | A1* | 11/2019 | Isager | G06F 16/972 |
| 2020/0067938 | A1* | 2/2020 | Smith | G06F 9/5072 |
| 2021/0112060 | A1* | 4/2021 | Billawala | H04L 63/101 |
| 2021/0158349 | A1* | 5/2021 | Wardman | G06Q 20/322 |
| 2021/0400085 | A1* | 12/2021 | Stokes | H04L 63/20 |
| 2022/0006783 | A1* | 1/2022 | Hassanzadeh | H04L 63/0263 |
| 2022/0053009 | A1* | 2/2022 | Sanchez | H04L 63/1425 |
| 2022/0164431 | A1* | 5/2022 | Vigna | G06Q 10/067 |

(Continued)

OTHER PUBLICATIONS

Help users avoid breaking the Web for themselves #2021 (https://github.com/EFForg/privacybadger/issues/2021) May 31, 2018 ) (Year: 2018).*

*Primary Examiner* — Harris C Wang
(74) *Attorney, Agent, or Firm* — Greenberg Traurig, LLP

(57) ABSTRACT

The disclosed computer-implemented method for automated testing for domain blocking assessment may include performing a website analysis at least once without blocking any domains and repeatedly while blocking one domain at a time. The method may additionally include detecting discrepancies by comparing outcomes of performances of the website analysis, thereby identifying one or more domain blockages that cause one or more of the plurality of websites to be broken. The method may also include performing the website analysis repeatedly while performing and not performing the domain blockages. The method may further include comparing outcomes of performances of the website analyses for the other plurality of websites. The method may further include performing, in response to the comparison, a security action. Various other methods, systems, and computer-readable media are also disclosed.

20 Claims, 8 Drawing Sheets

(56) References Cited

U.S. PATENT DOCUMENTS

2022/0245013 A1\* 8/2022 Ciabarra, Jr. ....... G06F 11/3438
2023/0262093 A1\* 8/2023 Gupta ................ H04L 63/1425
726/1

\* cited by examiner

SYSTEMS AND METHODS FOR AUTOMATED TESTING FOR DOMAIN BLOCKING ASSESSMENT

BACKGROUND

Companies collect large amounts of telemetry about the usage of their products, and browser extensions are no exception. For example, browser extensions may block domains during browsing, and this domain blockage can break some functionality of a website that loads resources from one or more blocked domains. However, there is little information regarding what exactly triggered such an undesirable situation. For example, it may be unknown whether a reported breakage occurred because of blockage of one domain, blockage of another domain, or a combination of domains. Also, no information is available whether unblocking any of the blocked domains will solve the problem or create new problems in other websites. Unblocking any of the two may actually create new problems in other websites. The present disclosure, therefore, identifies and addresses a need for systems and methods for automated testing for domain blocking assessment.

SUMMARY

As will be described in greater detail below, the present disclosure describes various systems and methods for automated testing for domain blocking assessment.

In one example, a method for automated testing for domain blocking assessment may include performing, by at least one processor for a plurality of websites, a website analysis, including performing the website analysis at least once without blocking any domains and performing the website analysis repeatedly while blocking one domain at a time. The method may additionally include detecting discrepancies, by the at least one processor, by comparing outcomes of performances of the website analysis for the plurality of websites, thereby identifying one or more domain blockages that cause one or more of the plurality of websites to be broken. The method may also include performing, by the at least one processor for another plurality of websites, the website analysis repeatedly while performing the domain blockages and not performing the domain blockages. The method may further include comparing, by the at least one processor, outcomes of performances of the website analysis for the other plurality of websites to outcomes of performances of the website analysis for the plurality of websites. The method may further include performing, by the at least one processor in response to the comparison, a security action.

In some implementations of the method, performing the security action may include determining that the performances of the website analysis for the other plurality of websites does not reveal that unblocking a domain associated with a domain blockage is counterproductive for the other plurality of websites. In such implementations, performing the security action may additionally include unblocking, in response to the determination, the domain associated with the domain blockage. In such implementations, performing the security action may also include intercepting, in response to the determination, one or more functionalities of the domain by selectively blocking one or more website scripts that cause the plurality of websites to be broken. In some of these implementations, performing the security action may include storing, in response to the determination, a hierarchy of resources loaded by the domain associated with the domain blockage.

In some implementations of the method, performing the security action may include determining that performances of the website analysis for the other plurality of websites reveal that unblocking a domain associated with a domain blockage is counterproductive for the other plurality of websites. In such implementations, performing the security action may additionally include selectively blocking, in response to the determination, the domain associated with the domain blockage, wherein the selective blocking occurs for one or more websites of the plurality of websites and is not performed for one or more websites of the other plurality of websites.

In some implementations of the method, the plurality of websites contains websites that are reported as broken and the other plurality of websites contains other websites that are not reported as broken.

In some implementations of the method, the website analysis includes employing a template to search, by the at least one processor, for attributes of a website that trigger activities vulnerable to domain blockage. In such implementations, the website analysis may additionally include activating, by the at least one processor in response to detection of one or more of the attributes, one or more of the activities triggered thereby. In such implementations, the website analysis may also include storing, by the at least one processor, information regarding website activity occurring at least one of before or after the activation of the one or more activities. In some of these implementations, the template may be configured to search for activities that include at least one of playing media, performing searches, or including items in carts. Alternatively or additionally, the information regarding website activity in some of these implementations corresponds to information regarding at least one of visual modifications, external requests, internal requests, or calls of website scripts.

In one embodiment, a system for automated testing for domain blocking assessment may include at least one physical processor and physical memory that includes computer-executable instructions that, when executed by the physical processor, cause the physical processor to perform, for a plurality of websites, a website analysis, including performing the website analysis at least once without blocking any domains and performing the website analysis repeatedly while blocking one domain at a time. The computer-executable instructions may additionally cause the physical processor to detect discrepancies by comparing outcomes of performances of the website analysis for the plurality of websites, thereby identifying one or more domain blockages that cause one or more of the plurality of websites to be broken. The computer-executable instructions may also cause the physical processor to perform, for another plurality of websites, the website analysis repeatedly while performing the domain blockages and not performing the domain blockages. The computer-executable instructions may further cause the physical processor to compare outcomes of performances of the website analysis for the other plurality of websites. The computer-executable instructions may additionally cause the physical processor to perform, in response to the comparison, a security action.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to perform, for a plurality of websites, a website analysis, including performing the website analysis at least once without blocking any domains and performing the website analysis repeatedly while blocking one domain at a time. The computer-executable instructions may additionally cause the computing device to detect discrepancies by comparing outcomes of performances of the website analysis for the plurality of websites, thereby identifying one or more domain blockages that cause one or more of the plurality of websites to be broken. The computer-executable instructions may also cause the computing device to perform, for another plurality of websites, the website analysis repeatedly while performing the domain blockages and not performing the domain blockages. The computer-executable instructions may further cause the computing device to compare outcomes of performances of the website analysis for the other plurality of websites. The computer-executable instructions may further cause the computing device to perform, in response to the comparison, a security action.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
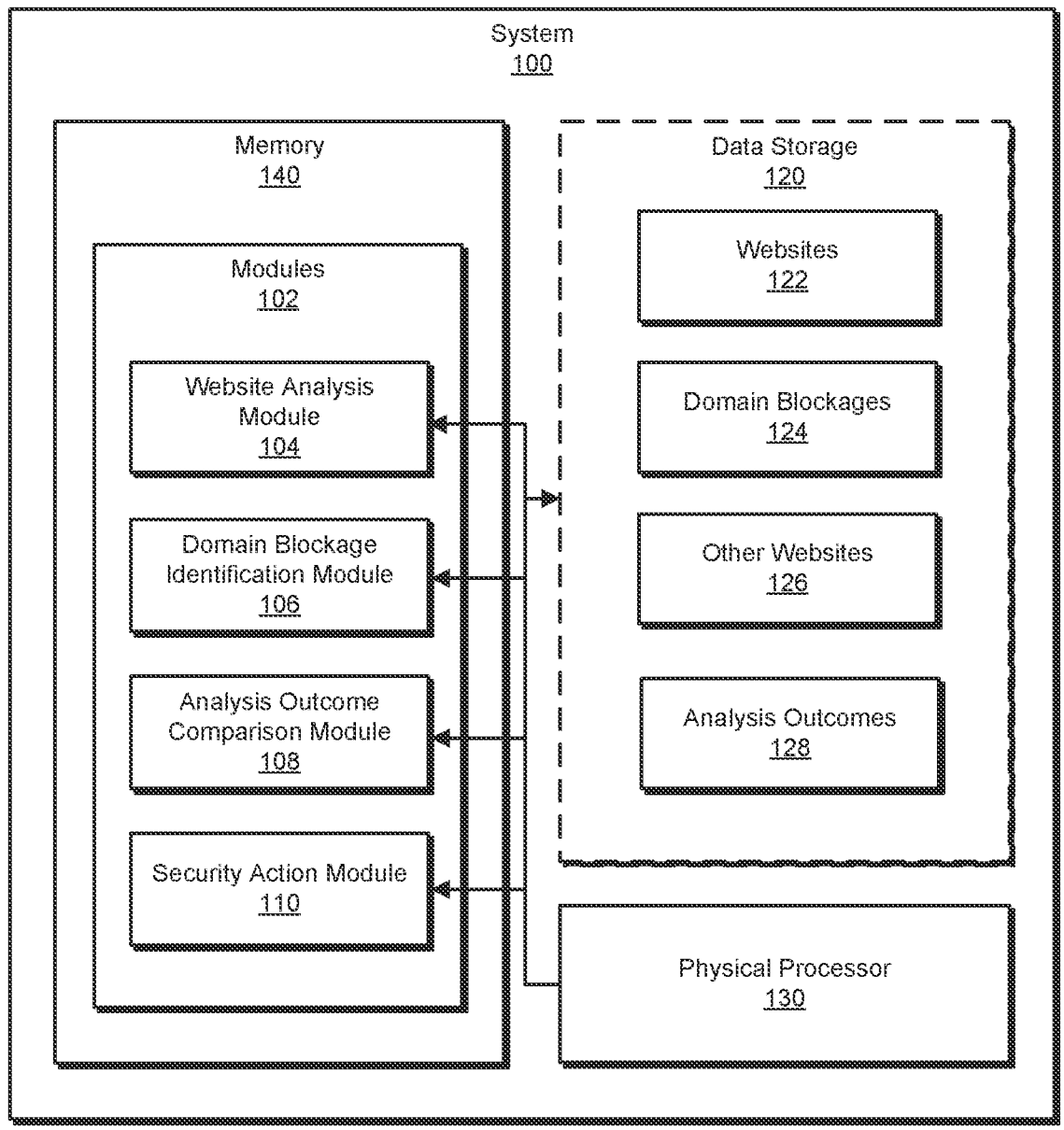
FIG. 1 is a block diagram of an example system for automated testing for domain blocking assessment.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for automated testing for domain blocking assessment. As will be explained in greater detail below, by analyzing telemetry and estimating the impact of new domain blocking rules specific fine-grained rules may be developed regarding, for example, intercepting website functionalities of a domain and/or selectively blocking a domain for only a portion of websites. By performing a website analysis for one set of websites, detecting discrepancies, and comparing outcomes, the disclosed systems and methods may identify one or more domain blockages that cause one or more of the plurality of websites to be broken. Then, by performing the website analysis for another plurality of websites and comparing the outcomes, the disclosed systems and methods may develop appropriate rules as described herein. The proposed systems and methods may further use these rules to perform security actions.

In addition, the systems and methods described herein may improve the functioning of a computing device by enabling the computing device to protect users effectively while avoiding unnecessarily blocking domains and/or reducing domain blockages that may be counterproductive in some websites.

Figure 2:
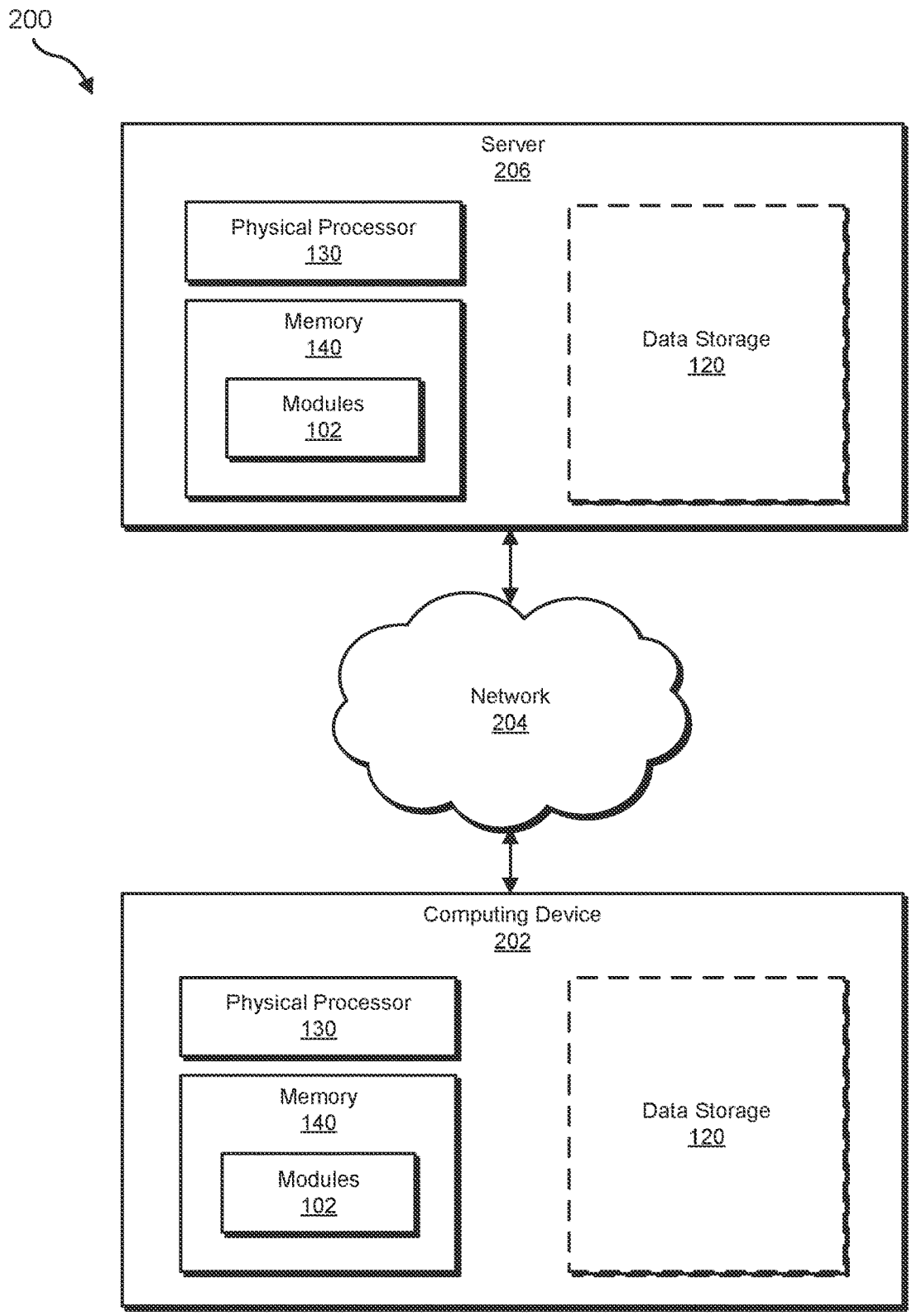
FIG. 2 is a block diagram of an additional example system for automated testing for domain blocking assessment.

The following will provide, with reference to FIGS. 1-2, detailed descriptions of example systems for automated testing for domain blocking assessment. Detailed descriptions of corresponding computer-implemented methods will also be provided in connection with FIG. 3. Detailed descriptions of example methods for performing a website analysis and performing security actions will further be provided in connections with FIGS. 4-6. In addition, detailed descriptions of an example computing system and network architecture capable of implementing one or more of the embodiments described herein will be provided in connection with FIGS. 7 and 8, respectively.

FIG. 1 is a block diagram of an example system 100 for automated testing for domain blocking assessment. As illustrated in this figure, example system 100 may include one or more modules 102 for performing one or more tasks. As will be explained in greater detail below, modules 102 may include website analysis module 104, a domain blockage identification module 106, an analysis outcome comparison module 108, and a security action module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate automated testing for domain blocking assessment. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more instances of stored data, such as data storage 120. Data storage 120 generally represents any type or form of stored data. In one example, data storage 120 may include databases, spreadsheets, tables, lists, matrices, trees, or any other type of data structure. Examples of data storage 120 include, without limitation, websites data 122, domain blockages data 124, other websites data 126, and/or analysis outcomes data 128.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to perform automated testing for domain blocking assessment. For example, and as will be described in greater detail below, one or more of modules 102 may cause computing device 202 and/or server 206 to perform, for a plurality of websites, a website analysis, including performing the website analysis at least once without blocking any domains and performing the website analysis repeatedly while blocking one domain at a time. Additionally, one or more of modules 102 may cause computing device 202 and/or server 206 to detect discrepancies by comparing outcomes of performances of the website analysis for the plurality of websites, thereby identifying one or more domain blockages that cause one or more of the plurality of websites to be broken. Also, one or more of modules 102 may cause computing device 202 and/or server 206 to perform, for another plurality of websites, the website analysis repeatedly while performing the domain blockages and not performing the domain blockages. Further, one or more of modules 102 may cause computing device 202 and/or server 206 to compare outcomes of performances of the website analysis for the other plurality of websites to outcomes of performances of the website analysis for the plurality of websites. Further, one or more of modules 102 may cause computing device 202 and/or server 206 to perform, in response to the comparison, a security action.

Computing device 202 generally represents any type or form of computing device capable of reading computer-executable instructions. For example, computing device 202 may be any computer that employs web browsing functionality. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of employing web browsing functionality. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
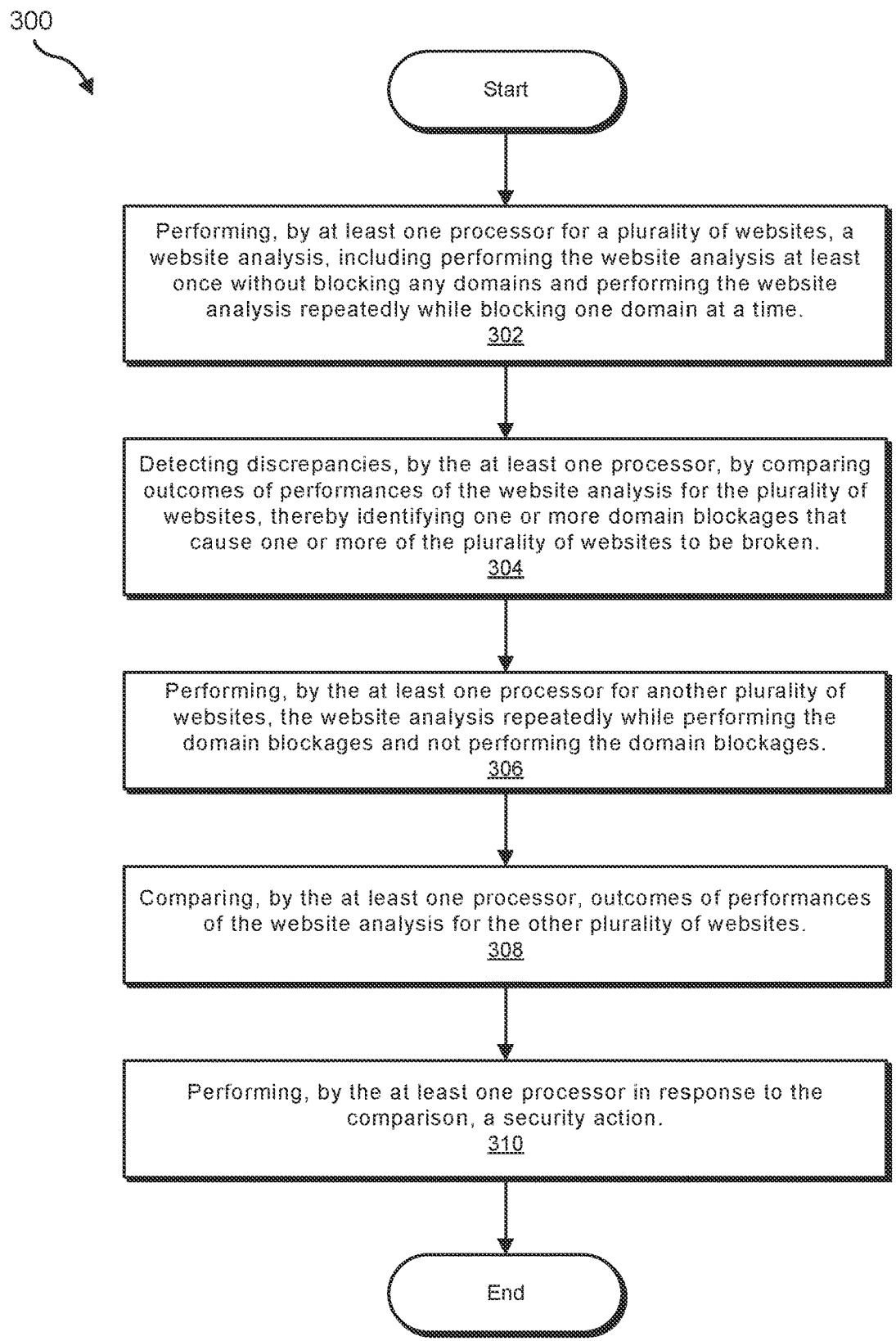
FIG. 3 is a flow diagram of an example method for automated testing for domain blocking assessment.

FIG. 3 is a flow diagram of an example computer-implemented method 300 for automated testing for domain blocking assessment. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may perform, by at least one processor for a plurality of websites, a website analysis, including performing the website analysis at least once without blocking any domains and performing the website analysis repeatedly while blocking one domain at a time. For example, website analysis module 104 may, as part of computing device 202 and/or server 206 in FIG. 2, produce at least a portion of analysis outcomes data 128 based on websites data 122.

The term "blocking," as used herein, generally refers to any technique that prevents resources from being loaded from a domain. For example, and without limitation, blocking may include domain name server blocking, which may prevent a valid IP address from being returned in response to a domain name. For example, instead of returning a valid IP address of a requested site on a block list, a domain name server might reply that the domain is unknown or with a different IP address that directs to a site with a page stating that the requested domain is not permitted.

The term "domain," as used herein, generally refers to an identification string that defines a realm of administrative autonomy, authority or control within the Internet. For example, and without limitation, a domain may include a domain name corresponding to a set of network addresses. Domain names may be used in various networking contexts and for application-specific naming and addressing purposes. In general, a domain name identifies a network domain, or it represents an Internet Protocol (IP) resource, such as a personal computer used to access the Internet, a server computer hosting a website, or the website itself or any other service communicated via the Internet.

The term "website," as used herein, generally refers to a collection of web pages and related content that is identified by a common domain name and published on at least one web server. For example, and without limitation, notable websites may include are wikipedia.org, google.com, amazon.com, etc. All publicly accessible websites collectively constitute the World Wide Web. There are also private websites that can only be accessed on a private network, such as a company's internal website for its employees.

Website analysis module 104 may perform the website analysis in a variety of ways. For example, website analysis module 104 may perform the analysis by employing a template to search for attributes that trigger activities vulnerable to domain blockage, activate those activities, and store information regarding website activity occurring before and/or after the activation of the activities. This process may be performed for a set of broken websites while blocking each of the domains from which the broken websites load resources and again while blocking each combination of two or more of those domains. The outcomes for each individual domain blockage and combinations of domain blockages may be recorded as part of the set of analysis outcomes data 128 for the website analysis performed at step 302. Additional details regarding example website analyses are provided below in connection with FIG. 4.

At step 304, one or more of the systems described herein may detect discrepancies, by the at least one processor, by comparing outcomes of performances of the website analysis for the plurality of websites, thereby identifying one or more domain blockages that cause one or more of the plurality of websites to be broken. For example, analysis outcome comparison module 108 and domain blockage identification module 106 may, as part of computing device 202 and/or server 206 in FIG. 2, produce at least a portion of domain blockages data 124 based on analysis outcomes data 128.

The term "broken," as used herein, generally refers to websites having website scripts that fail to execute properly. For example, and without limitation, a broken website may include a website having a link that no longer works, a website having a feature that does not execute because of a broken link on another domain from which the feature loads resources, etc.

Analysis outcome comparison module 108 and domain blockage identification module 106 may perform the comparison and domain blockage identification in a variety of ways. For example, analysis outcome comparison module 108 may perform the analysis by determining which domains and/or combinations of domains cause the websites to be broken and create a list or other record of each individual domain or combination of domains that result in a broken website. Additionally, domain blockage identification module 106 may process this list or other records to remove duplicate domains, thus producing another record of domains to be blocked in the performance of domain blockages. This list may correspond to a blacklist of domains.

At step 306, one or more of the systems described herein may perform, by the at least one processor for another plurality of websites, the website analysis repeatedly while performing the domain blockages and not performing the domain blockages. For example, website analysis module 104 may, as part of computing device 202 and/or server 206 in FIG. 2, produce at least a portion of analysis outcomes data 128 based on domain blockages data 124 and other websites data 126.

Website analysis module 104 may perform the website analysis in a variety of ways. For example, website analysis module 104 may perform the analysis by employing a template to search for attributes that trigger activities vulnerable to domain blockage, activate those activities, and storing information regarding website activity occurring before and/or after the activation of the activities. This process may be performed for a set of websites that are not reported as broken. As in step 302, the process may be performed while blocking each of the domains associated with the domain blockages data 124 and again while blocking each combination of two or more of those domains. Alternatively, the process may be performed while blocking all of the domains and then repeatedly while unblocking one domain at a time and/or combinations thereof. The outcomes for each individual domain blockage and combinations of domain blockages may be recorded as part of the set of analysis outcomes data 128 for the website analysis performed at step 304. Additional details regarding example website analyses are provided below in connection with FIG. 4.

At step 308, one or more of the systems described herein may compare, by the at least one processor, outcomes of performances of the website analysis for the other plurality of websites. For example, analysis outcome comparison module 108 may, as part of computing device 202 and/or server 206 in FIG. 2, develop security action rules based on analysis outcomes data 128.

Analysis outcome comparison module 108 may perform the website analysis in a variety of ways. For example, analysis outcome comparison module 108 may perform the comparison by determining whether unblocking domains in websites that are not reported as broken is counterproductive for those websites. This information may be used to develop security action rules as further detailed later herein in connection with FIGS. 5 and 6.

At step 310, one or more of the systems described herein may perform, by the at least one processor in response to the comparison, a security action. For example, security action module 110 may, as part of computing device 202 and/or server 206 in FIG. 2, perform one or more security actions.

Security action module 110 may perform the security action in a variety of ways. For example, security action module 110 may perform the security action by selectively blocking domains for only a portion of the websites and/or unblocking one or more domains and intercepting one or more functionalities of one or more domains. Further details regarding such security actions are provided later herein in connection with FIGS. 5 and 6.

Figure 4:
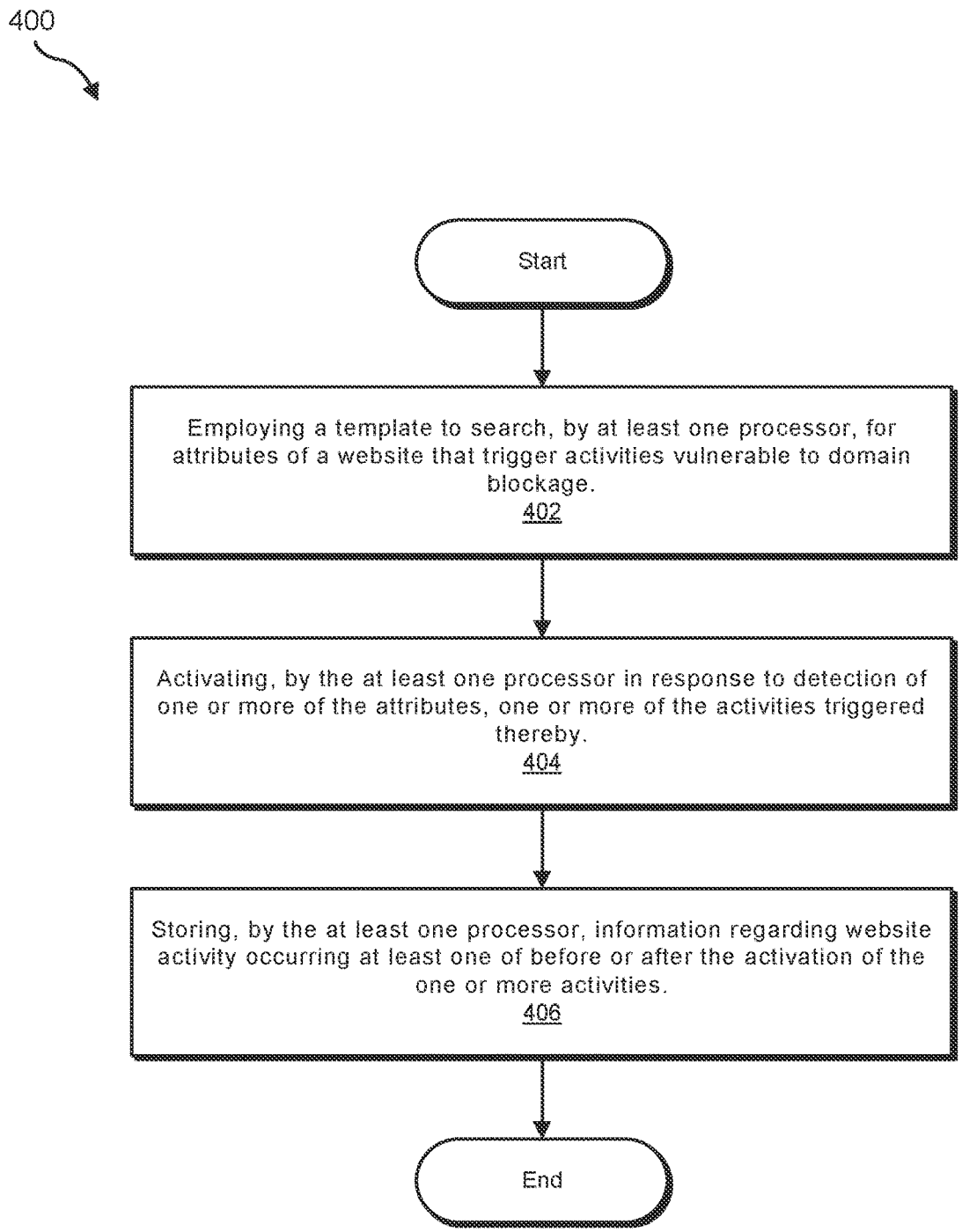
FIG. 4 is flow diagram of an example method for performing a website analysis.

As illustrated in FIG. 4, a method 400 for performing a website analysis may facilitate steps 302 and 306 of method 300 by generating outcomes for various domain blockages. For example, at step 402, the method 400 may employ a template to search, by the at least one processor, for attributes of a website that trigger activities vulnerable to domain blockage. Additionally, at step 404, the method 400 may activate, by the at least one processor in response to detection of one or more of the attributes, one or more of the activities triggered thereby. Also, at step 406, the method 400 may store, by the at least one processor, information regarding website activity occurring at least one of before or after the activation of the one or more activities. The template may be configured to search for activities that include at least one of playing media, performing searches, or including items in carts. Alternatively or additionally, the information regarding website activity in some of these implementations corresponds to information regarding at least one of visual modifications, external requests, internal requests, or calls of website scripts.

Figure 5:
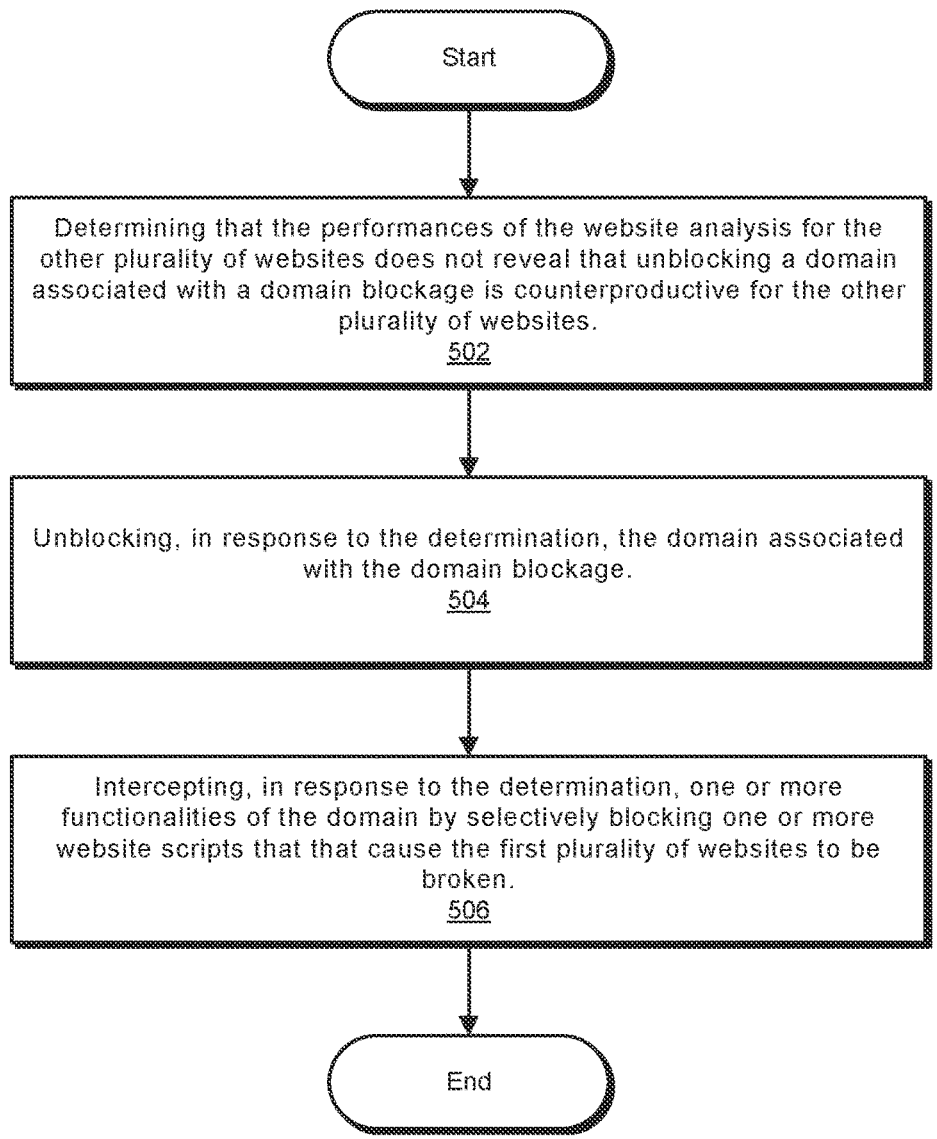
FIG. 5 is flow diagram of an example method for performing a security action by unblocking a domain and intercepting one or more functionalities of the domain.

As illustrated in FIG. 5, a method 500 for performing a security action may unblock one or more domains and intercept one or more functionalities of the one or more domains. For example, at step 502, the method 500 may determine, for a particular domain blockage or combination of domain blockages, that the performances of the website analysis for the other plurality of websites does not reveal that unblocking a domain associated with a domain blockage is counterproductive for the other plurality of websites. In response to this determination, a security action rule may be developed to unblock the domain or domains and intercept one or more functionalities of the domain or domains by selectively blocking one or more website scripts that cause the first plurality of websites to be broken. Toward this purpose, method 500 may store a hierarchy of resources loaded by one or more domains associated with the domain blockage(s). Accordingly, method 500 may, at step 504, apply this rule by unblocking a domain associated with a domain blockage. Also, method 500 may, at step 506, apply the rule by intercepting one or more functionalities of a domain by selectively blocking one or more website scripts that cause the first plurality of websites to be broken. This method advantageously avoids unnecessarily blocking one or more domains.

Figure 6:
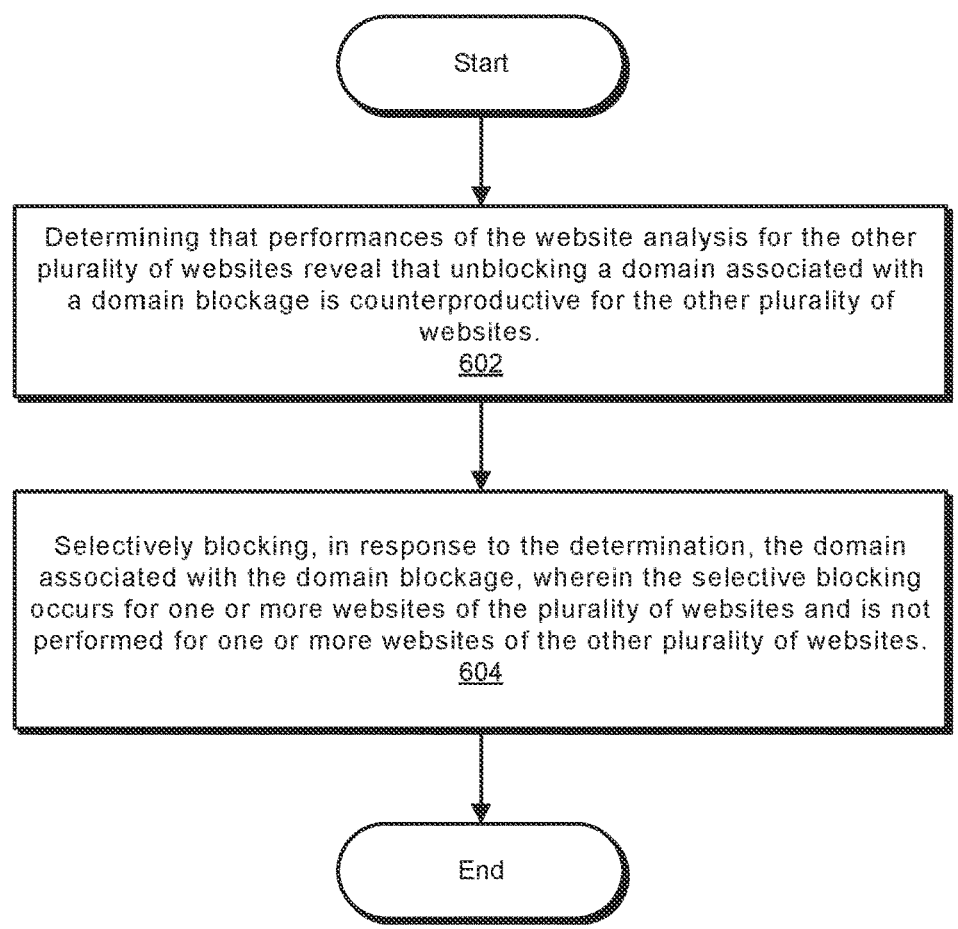
FIG. 6 is a flow diagram of an example method for performing a security action by selectively blocking a domain.

As illustrated in FIG. 6, a method 600 for performing a security action may selectively block one or more domains. For example, at step 602, the method 600 may, for a particular domain blockage or combination of domain blockages, determine that performances of the website analysis for the other plurality of websites reveal that unblocking a domain associated with a domain blockage is counterproductive for the other plurality of websites. In response to this determination, a security action rule may be developed to selectively block a domain associated with a domain blockage, wherein the selective blocking occurs for one or more websites of the plurality of websites and is not performed for one or more websites of the other plurality of websites. Accordingly, method 600 may, at step 604, apply this rule by selectively blocking the domain only for a subset of the websites. This method advantageously reduces blocking of domains when the blockage may be counterproductive for other websites.

The foregoing disclosure details systems and methods that analyze telemetry, estimate the impact of new blocking rules, and recommend specific fine-grained solutions. The methodology is based on two different main phases: an analysis phase and a testing approach. Each of these phases includes different steps in order to arrive at the final objective.

An analysis phase may include generating a set of general "browsing templates" that may test the most common activities that cease to work due to domain blockage, such as playing media, performing searches, or including items in carts. For instance, a template may search for video players using HTML and CSS attributes (e.g., <video tabindex="-1" class="video-stream html5-main-video" webkit-playsinline=" "></video>), and visual aspects like play or volume buttons. Once one or more of these attributes is detected, the analysis may proceed by clicking a corresponding start button (e.g., <div onclick="start ( )" style="cursor: pointer; "></div>).

An analysis tool used in this phase may store everything that happens before and after every action defined in the corresponding template, including visual modifications, external and internal requests, and JavaScript calls. This stored information may enable detection, for example, that the video of the above example started playing in the screen: a JavaScript call triggered from the clicked element started a video request (e.g., video/mp4 or application/x-mpegURL), and the related screen portion changed its content.

The testing approach may include, starting with most reported websites in the telemetry, run the analysis phase without blocking any domain. This test facilitates understanding of the expected behavior of the website in a generic case. Thereafter, the testing approach may proceed by removing one domain at a time and checking an equivalent output. Comparing these values facilitates detection of discrepancies and finds the source of the problem, providing information about the domains that should be blocked and the domains for which blocking should be avoided. Unblocking domains can be counterproductive in other websites, as the domain blockage was not breaking anything there. In order to verify it, the testing approach may proceed in a similar manner for other prominent websites that load content from that same domain.

Checking the templates while blocking that domain and not blocking it, the testing approach can reveal if the same situation arises in all of the websites. If so, a determination can be made to stop blocking the domain and start taking other options (e.g., intercepting certain functionalities). If no difference is detected as it was happening in the original reported website, the hierarchy of resource loaded by that domain may be stored. However, if the testing approach reveals different behavior when blocking a domain, a special rule may be generated for performing the blockage to avoid under blocking, and still protect the users. For instance, such a rule may not block example.com if it was loaded by testing.net. In those exact situations, blocking that domain can break the video functionality of the website. However, if that is loaded by other entities, the rule may be enforced to block it without any breakage risk.

Figure 7:
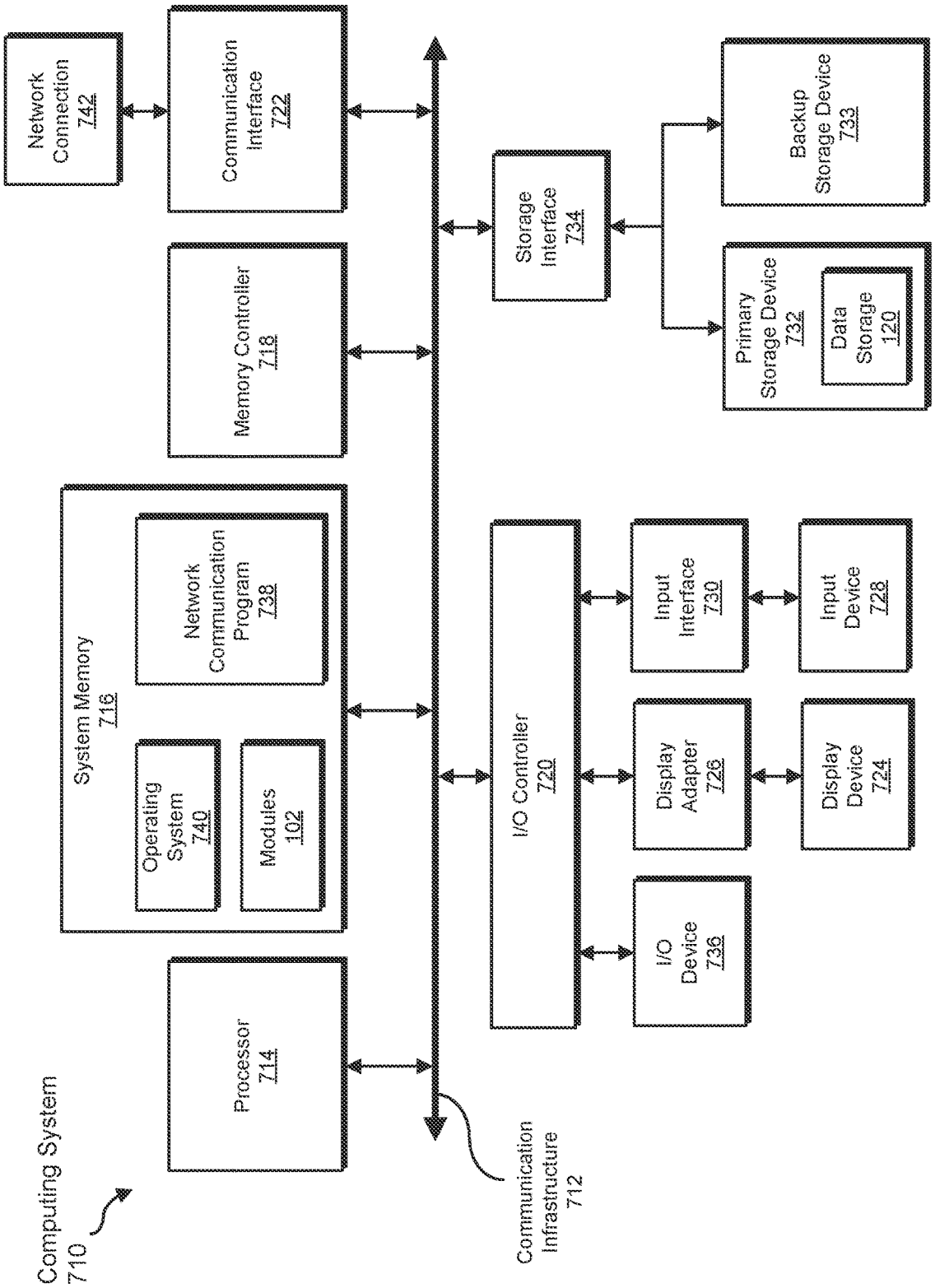
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, data storage 120 from FIG. 1 may be stored and/or loaded in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
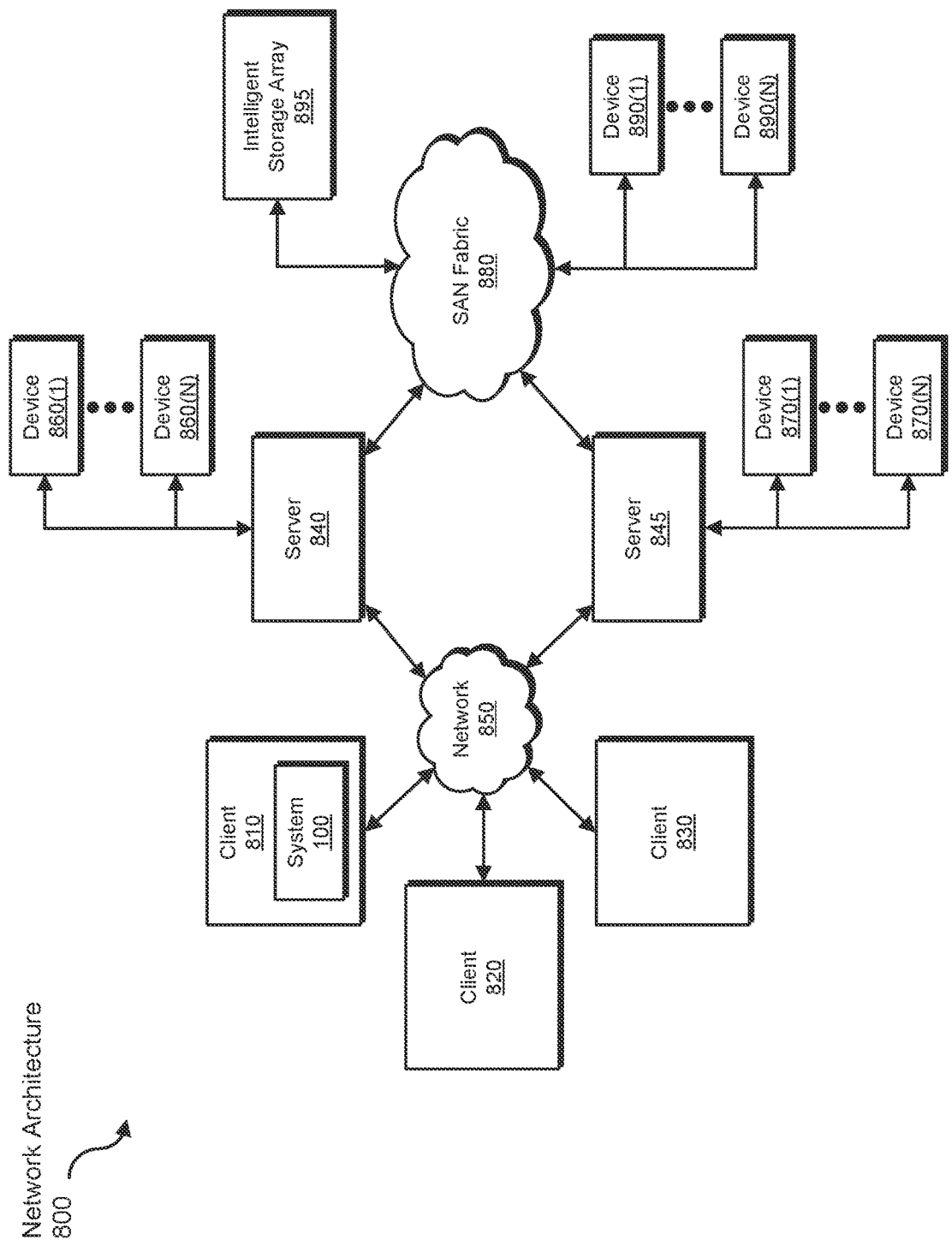
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the present disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for automated testing for domain blocking assessment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive telemetry about domain blockages to be transformed, transform the telemetry about domain blockages, output a result of the transformation to provide outcomes of website analyses, use the result of the transformation to develop security action rules, and store the result of the transformation to provide security actions that avoid unnecessary domain blockages and reduce domain blockages that may be counterproductive in some websites. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automated testing for domain blocking assessment, at least a portion of the method being performed by a computing device comprising at least one processor, the method comprising:
    performing, by the at least one processor for a plurality of websites, a website analysis employing a template to search for attributes of a website that trigger activities vulnerable to domain blockage, activating, in response to detection of one or more of the attributes, one or more of the activities triggered thereby, and storing information regarding website activity occurring at least one of before or after the activation of the one or more activities, and including performing the website analysis at least once without blocking any domains and performing the website analysis repeatedly while blocking one domain at a time;
    detecting discrepancies, by the at least one processor, by comparing outcomes of performances of the website analysis for the plurality of websites, thereby identifying one or more domain blockages that cause one or more of the plurality of websites to be broken;
    performing, by the at least one processor for another plurality of websites, the website analysis repeatedly while performing the domain blockages and not performing the domain blockages;
    comparing, by the at least one processor, outcomes of performances of the website analysis for the other plurality of websites; and
    performing, by the at least one processor in response to the comparison, a security action.

2. The method of claim 1, wherein performing the security action includes:
    determining that the performances of the website analysis for the other plurality of websites does not reveal that unblocking a domain associated with a domain blockage is counterproductive for the other plurality of websites;
    unblocking, in response to the determination, the domain associated with the domain blockage; and
    intercepting, in response to the determination, one or more functionalities of the domain by selectively blocking one or more website scripts that cause the plurality of websites to be broken.

3. The method of claim 2, wherein performing the security action further includes:
    storing, in response to the determination, a hierarchy of resources loaded by the domain associated with the domain blockage.

4. The method of claim 1, wherein performing the security action includes:
    determining that performances of the website analysis for the other plurality of websites reveal that unblocking a domain associated with a domain blockage is counterproductive for the other plurality of websites; and selectively blocking, in response to the determination, the domain associated with the domain blockage, wherein the selective blocking occurs for one or more websites of the plurality of websites and is not performed for one or more websites of the other plurality of websites.

5. The method of claim 1, further comprising:

developing, by the at least one processor, one or more security action rules based on whether the performances of the website analysis reveal that unblocking a domain associated with a domain blockage is counterproductive for the other plurality of websites, wherein the plurality of websites contains websites that are reported as broken and the other plurality of websites contains other websites that are not reported as broken and the security action is performed by applying the one or more security action rules.

6. The method of claim 1, wherein the template is configured to search for activities that include at least one of playing media, performing searches, or including items in carts.

7. The method of claim 1, wherein the information regarding website activity includes information regarding at least one of visual modifications, external requests, internal requests, or calls of website scripts.

8. A system for automated testing for domain blocking assessment, the system comprising:

at least one physical processor; and physical memory comprising computer-executable instructions that, when executed by the physical processor, cause the physical processor to:

perform, for a plurality of websites, a website analysis employing a template to search for attributes of a website that trigger activities vulnerable to domain blockage, activate, in response to detection of one or more of the attributes, one or more of the activities triggered thereby, and store information regarding website activity occurring at least one of before or after the activation of the one or more activities, and including performing the website analysis at least once without blocking any domains and performing the website analysis repeatedly while blocking one domain at a time;

detect discrepancies by comparing outcomes of performances of the website analysis for the plurality of websites, thereby identifying one or more domain blockages that cause one or more of the plurality of websites to be broken;

perform, for another plurality of websites, the website analysis repeatedly while performing the domain blockages and not performing the domain blockages;

compare outcomes of performances of the website analysis for the other plurality of websites; and perform, in response to the comparison, a security action.

9. The system of claim 8, wherein the computer-executable instructions cause the physical processor to perform the security action at least in part by:

determining that the performances of the website analysis for the other plurality of websites does not reveal that unblocking a domain associated with a domain blockage is counterproductive for the other plurality of websites;

unblocking, in response to the determination, the domain associated with the domain blockage; and intercepting, in response to the determination, one or more functionalities of the domain by selectively blocking one or more website scripts that cause the plurality of websites to be broken.

10. The system of claim 9, wherein the computer-executable instructions further cause the physical processor to perform the security action at least in part by:

storing, in response to the determination, a hierarchy of resources loaded by the domain associated with the domain blockage.

11. The system of claim 8, wherein the computer-executable instructions cause the physical processor to perform the security action at least in part by:

determining that performances of the website analysis for the other plurality of websites reveal that unblocking a domain associated with a domain blockage is counterproductive for the other plurality of websites; and selectively blocking, in response to the determination, the domain associated with the domain blockage, wherein the selective blocking occurs for one or more websites of the plurality of websites and is not performed for one or more websites of the other plurality of websites.

12. The system of claim 8, wherein the plurality of websites contains websites that are reported as broken and the other plurality of websites contains other websites that are not reported as broken.

13. The system of claim 8, wherein the template is configured to search for activities that include at least one of playing media, performing searches, or including items in carts.

14. The system of claim 8, wherein the information regarding website activity includes information regarding at least one of visual modifications, external requests, internal requests, or calls of website scripts.

15. A non-transitory computer-readable medium comprising one or more computer-executable instructions that, when executed by at least one processor of a computing device, cause the computing device to:

perform, for a plurality of websites, a website analysis, by the at least one processor, employing a template to search for attributes of a website that trigger activities vulnerable to domain blockage, activating, in response to detection of one or more of the attributes, one or more of the activities triggered thereby, and storing information regarding website activity occurring at least one of before or after the activation of the one or more activities, and including performing the website analysis at least once without blocking any domains and performing the website analysis repeatedly while blocking one domain at a time;

detect discrepancies by comparing outcomes of performances of the website analysis for the plurality of websites, thereby identifying one or more domain blockages that cause one or more of the plurality of websites to be broken;

perform, for another plurality of websites, the website analysis repeatedly while performing the domain blockages and not performing the domain blockages;

compare outcomes of performances of the website analysis for the other plurality of websites; and perform, in response to the comparison, a security action.

16. The non-transitory computer-readable medium of claim 15, wherein the computer-executable instructions cause the computing device to perform the security action at least in part by:

determining that the performances of the website analysis for the other plurality of websites does not reveal that unblocking a domain associated with a domain blockage is counterproductive for the other plurality of websites;

unblocking, in response to the determination, the domain associated with the domain blockage; and intercepting, in response to the determination, one or more functionalities of the domain by selectively blocking one or more website scripts that cause the plurality of websites to be broken.

17. The non-transitory computer-readable medium of claim 15, wherein the computer-executable instructions cause the computing device to perform the security action at least in part by:

determining that performances of the website analysis for the other plurality of websites reveal that unblocking a domain associated with a domain blockage is counterproductive for the other plurality of websites; and selectively blocking, in response to the determination, the domain associated with the domain blockage, wherein the selective blocking occurs for one or more websites of the plurality of websites and is not performed for one or more websites of the other plurality of websites.

18. The non-transitory computer-readable medium of claim 15, wherein the plurality of websites contains websites that are reported as broken and the other plurality of websites contains other websites that are not reported as broken.

19. The non-transitory computer-readable medium of claim 15, wherein the template is configured to search for activities that include at least one of playing media, performing searches, or including items in carts.

20. The non-transitory computer-readable medium of claim 15, wherein the information regarding website activity includes information regarding at least one of visual modifications, external requests, internal requests, or calls of website scripts.

* * * * *